United States Patent [19]
Fujita et al.

[11] Patent Number: 5,469,420
[45] Date of Patent: Nov. 21, 1995

[54] MULTI-VALUE RECORDED DATA DETECTING METHOD

[75] Inventors: Goro Fujita, Kanagawa; Minoru Tobita, Tokyo, both of Japan

[73] Assignee: Sony Corporation, Japan

[21] Appl. No.: 260,118

[22] Filed: Jun. 15, 1994

Related U.S. Application Data

[63] Continuation of Ser. No. 930,058, Aug. 14, 1992, abandoned.

[30] Foreign Application Priority Data

Aug. 23, 1991 [JP] Japan .................................. 3-235718

[51] Int. Cl.⁶ .................................................. G11B 5/09
[52] U.S. Cl. .................................. 369/59; 360/32
[58] Field of Search .................. 369/59, 124, 59, 369/47, 48; 307/351, 358; 340/146.2; 382/49, 29; 360/32, 51; 327/58, 72

[56] References Cited

U.S. PATENT DOCUMENTS 4,477,926 10/1984 Linger et al. .................. 382/49
5,134,663 7/1992 Kozlowski .................. 382/29
5,189,650 2/1993 Watanabe et al. .................. 369/13

*Primary Examiner*—Scott J. Sugarman
*Assistant Examiner*—P. W. Huber
*Attorney, Agent, or Firm*—Limbach & Limbach; Charles P. Sammut

[57] ABSTRACT

A multi-value recorded data detecting method which can achieve accurate detection of multi-value data irrespective of a level variation or an amplitude variation of an input reproduction signal. A reproduction signal from a record medium, on which multi-value data are recorded, is converted from an analog signal into a digital signal in response to a reference clock signal to obtain signal level data. The signal level data are stored into memory means, and distribution information of the signal level data stored in the memory means are found out for each predetermined signal unit. Then, a threshold value or values are set in accordance with the distribution information, and the signal level data from the memory means are compared with the threshold value or values to obtain multi-value data.

5 Claims, 6 Drawing Sheets

FIG. 8A
(PRIOR ART)
A DATA     0   1   0   -1   1   0   0
FIG. 8B
(PRIOR ART)
B   REPRODUCTION SIGNAL
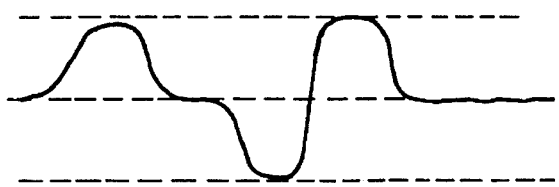
FIG. 8C
(PRIOR ART)
C   CK
FIG. 8D
(PRIOR ART)
D   A/D OUTPUT
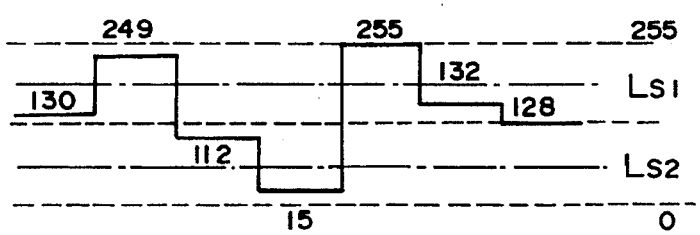
FIG. 8E
(PRIOR ART)
E   MULTI-VALUE REPRODUCTION DATA
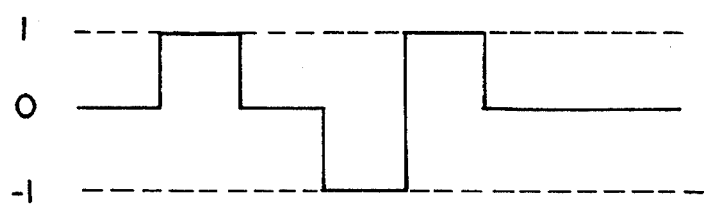

MULTI-VALUE RECORDED DATA DETECTING METHOD

This is a continuation of application Ser. No. 07/930,058 filed on Aug. 14, 1992, now abandoned.

BACKGROUND OF THE INVENTION

1. Field of the Invention

This invention relates to a multi-value recorded data detecting method suitably applied to reproduction of multi-value data recorded on a record medium such as an optical disk.

2. Description of the Related Art

A record medium such as, for example, an optical disk or an opto-magnetic disk has spiral or concentric tracks on which two-value or three- or more-value digital data are recorded in the form of concave or convex pits formed by by embossing or a like technique or in the form of different magnetization directions.

When the recorded data are to be reproduced, a laser beam is irradiated upon a track and a difference in intensity of the reflected light or a difference in polarization direction of the reflected light caused by a magnetic Kerr effect is detected to obtain a reproduction RF signal. Then, two-value or three- or more-value data are detected from the reproduction RF signal thus obtained.

FIG. 7 shows in block circuit diagram a reproducing circuit for detecting three-value data from an optical disk on which data are recorded in three values, and FIG. 8 shows waveforms at different portions of the circuit of FIG. 7. Referring first to FIG. 7, data are recorded in a predetermined track format on an optical disk 1, and the optical disk 1 is driven to rotate at a constant linear velocity (CLV) or a constant angular velocity (CAV) by a spindle motor 2. An optical head 3 for irradiating a laser beam upon recording or reproduction is disposed below the optical disk 1.

The optical head 3 includes an optical system including a laser light source, a collimator lens, a beam splitter, a two axial device for controlling an objective lens and so forth, and further includes a polarized beam splitter and a detector for detecting reflected light from the optical disk 1. Detection information from the detector which detects such reflected light is supplied as an electric signal to a calculating and amplifying circuit 4. The calculating and amplifying circuit 4 calculates the received detection information and generates a tracking servo signal, a focusing servo signal and a reproduction data signal. The tracking servo signal and the focusing servo signal are supplied to a servo controlling circuit 5. The servo controlling circuit 5 performs tracking and focusing servo operations of the optical head 3 in accordance with the thus received tracking servo signal and focusing servo signal.

Meanwhile, the reproduction data signal is amplified by an RF amplifier 6 and then inputted to an analog to digital (A/D) converter 7. A sampling clock signal CK for the analog to digital converter 7 is generated by a PLL (phase-locked loop) circuit 8, and predetermined threshold values $L_{S1}$ and $L_{S2}$ are supplied to a multi-value converting circuit 9. It is to be noted that reference characters A to E correspond to curves A to E of the waveform diagram of FIG. 8.

Now, if, for example, such three-value data including "0", "1" and "−1" as seen from the representation of FIG. 8A are recorded on the optical disk 1, a reproduction RF signal amplified by the RF amplifier 6 presents such a waveform as shown by the curve of FIG. 8B and is inputted to the analog to digital converter 7. At the analog to digital converter 7, the reproduction RF signal is sampled in accordance with such a sampling clock signal CK supplied thereto from the PLL circuit 8 as seen from the curve of FIG. 8C so that it is converted into digital codes. Here, if it is assumed that the output of the analog to digital converter 7 is 8-bit data and consequently the dynamic range of the analog to digital converter 7 is divided into 256 steps, then the signal level data of the reproduction RF signal are converted into such digital codes, for example, as seen from the curve of FIG. 8D, and the digital codes thus obtained are outputted from the analog to digital converter 7.

The output of the analog to digital converter 7 is inputted to the multi-value converting circuit 9, to which the predetermined threshold values $L_{S1}$ and $L_{S2}$ are supplied. Thus, the signal level data digitally coded into 256 steps as described above are individually compared with the threshold levels $L_{S1}$ and $L_{S2}$ at the multi-level converting circuit 9 so that they are classified into the three values of "0", "1" and "−1" as seen from the curve of FIG. 8E.

After three-value recorded data are detected in this manner, predetermined demodulating processing is performed for the thus detected data by performing error correcting processing and so forth in accordance with an ECC (Error Correction Code) included in the data.

By the way, a reproduction signal from such an optical disk as described above often suffers from a variation in level or a variation in amplitude arising from various factors including a difference in reflection factor between different optical disks or a difference in reproduction frequency characteristic between reproduction signals on the inner circumference side and the outer circumference side of a same optical disk.

If the threshold values upon multi-value conversion after analog to digital conversion are fixed while a level variation or an amplitude variation takes place with a reproduction signal in this manner, then the reproduction signal may be detected as an wrong value. Particularly where the data are three- or four- or more-value data, the number of required threshold values increases correspondingly, and the probability of wrong correction of multi-value data increases as much.

Since such detection error upon multi-value conversion cannot be corrected by error correcting processing based on an ECC at a following stage, accurate detection of multi-value data is required.

SUMMARY OF THE INVENTION

It is an object of the present invention to provide a multi-value recorded data detecting method which can achieve accurate detection of multi-value data irrespective of a level variation or an amplitude variation of an input reproduction signal.

In order to attain the object, according to an aspect of the present invention, there is provided a multi-value recorded data detecting method which comprises the steps of converting a reproduction signal from a record medium, on which multi-value data are recorded, from an analog signal into a digital signal in response to a reference clock signal to obtain signal level data, storing the signal level data into memory means, finding out distribution information of the signal level data stored in the memory means for each predetermined signal unit, setting a threshold value or values in accordance with the distribution information, and comparing the signal level data from the memory means with the threshold value or values to obtain multi-value data.

If occurrence frequency distribution information of signal level data is found out for each predetermined signal unit of a reproduction signal for each sector or the like in a recording format, for example, on an optical disk, then an optimum threshold value or values can be determined accurately as a reference or references for multi-value conversion from the occurrence frequency distribution information irrespective of a level variation or an amplitude variation of the reproduction signal. Consequently, the reliability in demodulation of data can be enhanced significantly, and the practical utility of a multi-value recording method is enhanced and the increase in density of recorded data is promoted accordingly.

The multi-value recorded data detecting method can be realized with a multi-value recorded data detecting apparatus which comprises means for generating a reference clock signal, means for converting a reproduction signal from a record medium, on which multi-value data are recorded, from an analog signal into a digital signal in response to the reference clock signal to produce signal level data, memory means for storing the signal level data therein, means for finding out distribution information of the signal level data stored in the memory means for each predetermined signal unit, means for setting a threshold value or values in accordance with the distribution information, and means for comparing the signal level data from the memory means with the threshold value or values to produce multi-value data.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 8A, 8B, 8C, 8D and 8E illustrate signal waveforms at different portions of the circuit shown in FIG. 7.

DETAILED DESCRIPTION OF THE PREFERRED EMBODIMENT

Figure 1:
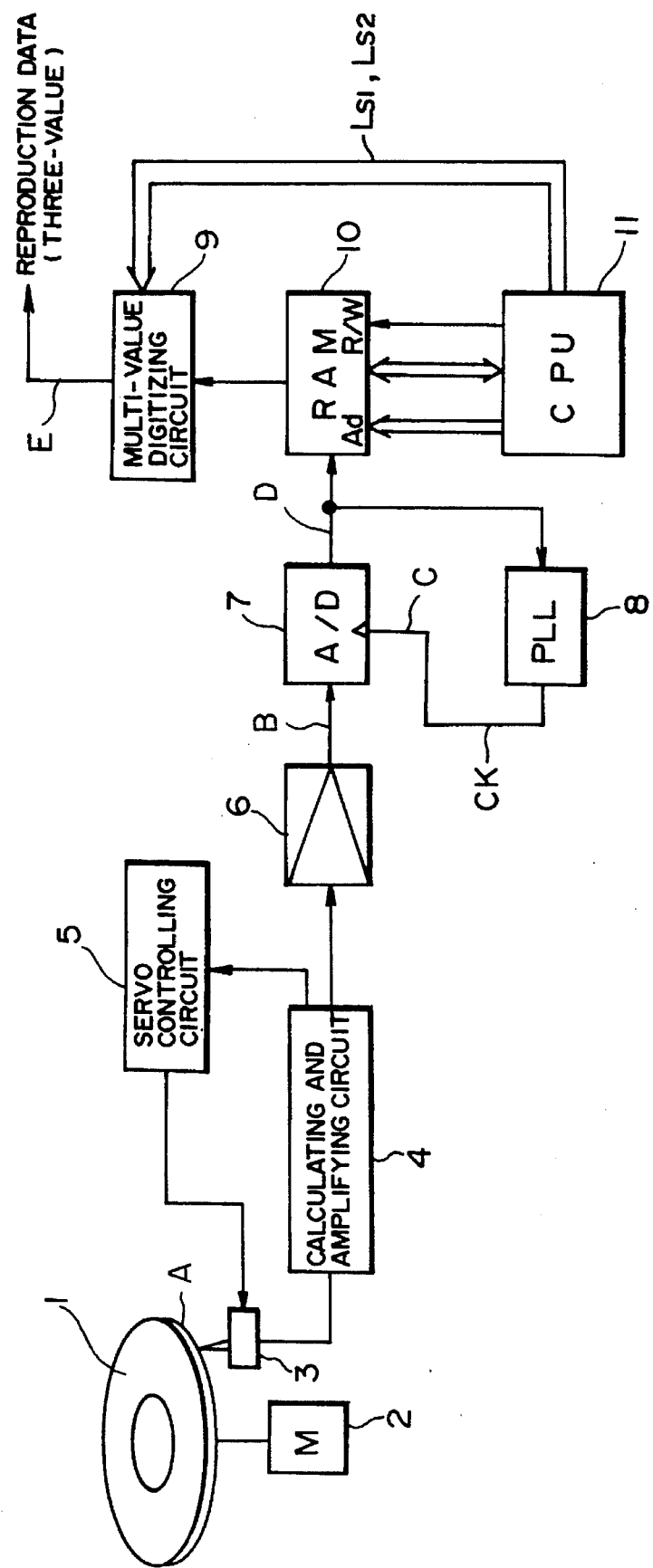
FIG. 1 is a block diagram of a circuit to which a multi-value recorded data detecting method according to the present invention is applied.
Figure 7:
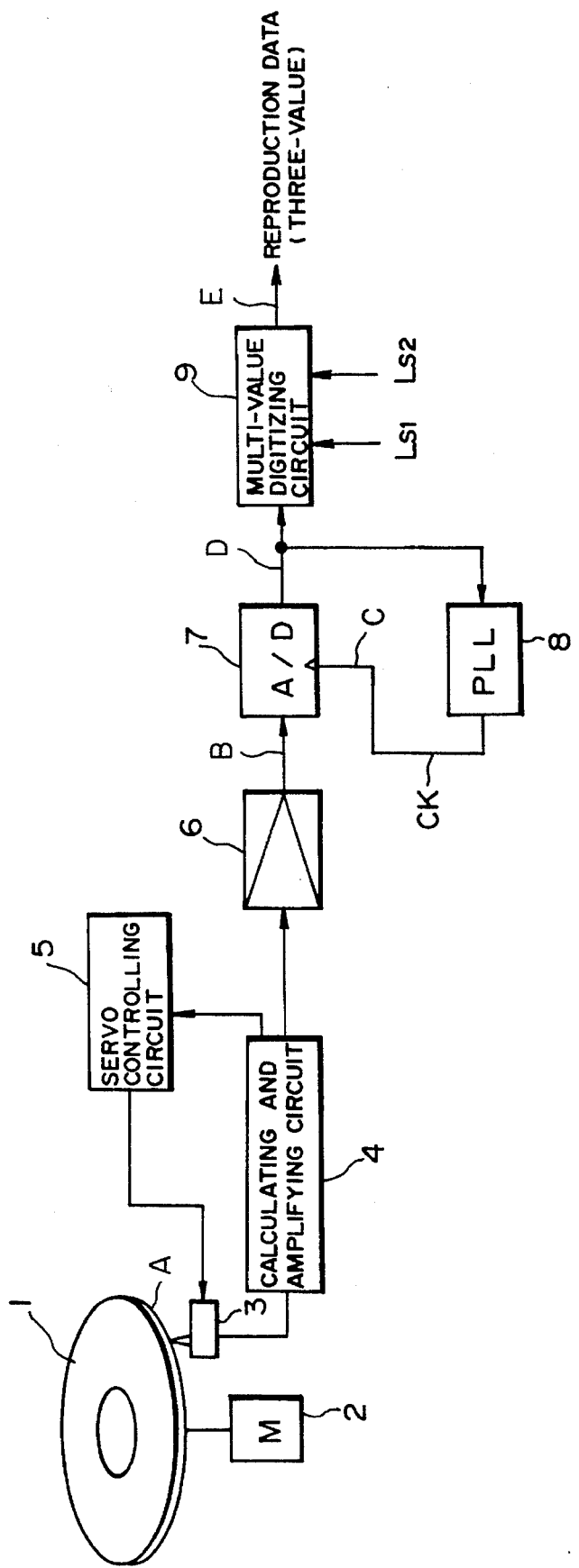
FIG. 7 is a block diagram of a reproducing circuit to which a conventional multi-value recorded data detecting method is applied.

Referring first to FIG. 1, there is shown in block circuit diagram a reproducing circuit to which a multi-value recorded data detecting method according to the present invention is applied. The reproducing circuit shown has a basically common construction to the reproducing circuit described hereinabove with reference to FIG. 7. Thus, common components of the reproducing circuit are first described briefly. In particular, the reproducing circuit includes a spindle motor 2 for driving an optical disk 1, on which data are recorded in a predetermined track format, to rotate at a constant linear velocity (CLV) or a constant angular velocity (CAV). An optical head 3 for irradiating a laser beam upon recording or reproduction is disposed below the optical disk 1. Detection information from a detector of the optical head 3 which detects reflected light from the optical head 3 is supplied as an electric signal to a calculating and amplifying circuit 4. The calculating and amplifying circuit 4 calculates the received detection information and generates a tracking servo signal, a focusing servo signal and a reproduction data signal. The tracking servo signal and the focusing servo signal are supplied to a servo controlling circuit 5. The servo controlling circuit 5 performs tracking and focusing servoing operations of the optical head 3 in accordance with the thus received tracking servo signal and focusing servo signal. Meanwhile, the reproduction data signal is amplified by an RF amplifier 6 and then inputted to an analog to digital converter 7. A sampling clock signal CK for the analog to digital converter 7 is generated by a PLL circuit 8, and multi-value data obtained are outputted from a multi-value converting circuit 9. It is to be noted that reference characters A to E correspond to curves A to E of the waveform diagram of FIG. 7.

The reproducing circuit 10 additionally includes a RAM (random access memory) 10, and a CPU (central processing unit) 11 which serves as a system controller and calculating means. Digitally coded signal level data, for example, of 8 bits outputted from the analog to digital converter 7 are inputted as data to be recorded to the RAM 10. The RAM 10 is controlled by the CPU 11 so that the signal level data may be successively stored for each sector of the optical disk 1 into the RAM 10. The CPU 11 further (1) calculates, when it is to execute calculating processing for each signal level data group for each sector stored in the RAM 10 and convert the signal level data in the unit of a sector into a three-value signal, (2) calculates threshold values $L_{S1}$ and $L_{S2}$ optimum for such conversion, and (3) controls a multi-value converting operation of the multi-value converting circuit 9.

Figure 2:
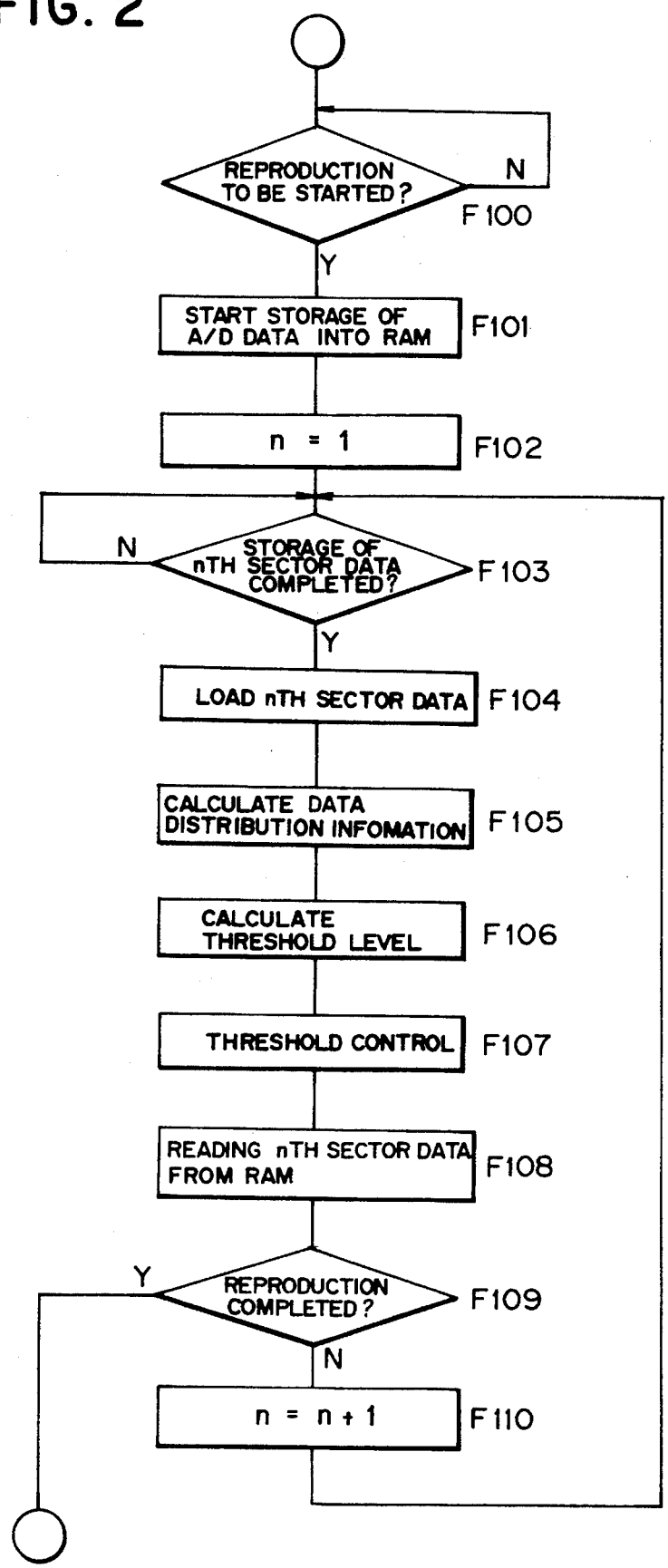
FIG. 2 is a flow chart illustrating controlling operation of the circuit shown in FIG. 1.

Operation of the CPU 11 upon reproduction of the reproducing circuit is illustrated in FIG. 2. Referring to FIG. 2, when a reproducing operation for the optical disk 1 is performed and a reproduction RF signal is supplied to the analog to digital converter 7 so that signal level data based on digital codes are obtained from the analog to digital converter 7 (F100), the CPU 11 controls the RAM 10 to successively store the signal level data therein (F101). Then, a-loop control variable n for a sector number is set to n=1 (F102).

Here, the recording format of the optical disk 1 may be such that one track is divided into a plurality of sectors each having an address portion, a data portion, a buffer portion and so forth and control data such as an address and data of a predetermined number of bytes from the data portion are reproduced from each sector. Thus, signal level data successively stored into the RAM 10 are processed for each one sector. In particular, at a point of time when all signal level data obtained by digitization of a reproduction RF signal of a first sector in a reproducing operation are stored into the RAM 10 (F103), the CPU 11 loads the signal level data therein (F104) and executes calculation to obtain distribution information of the signal level data group (F105).

Figure 3:
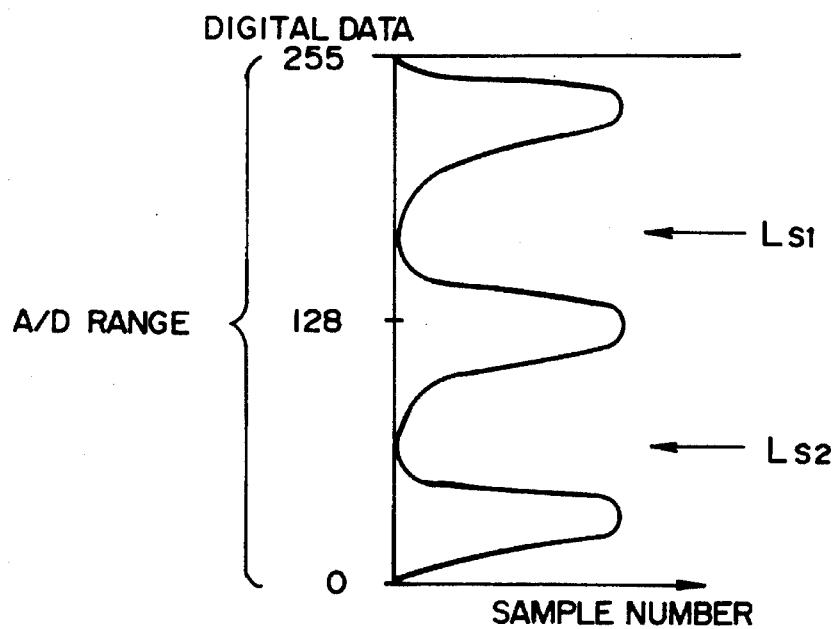
FIG. 3 is a diagram illustrating distribution information found by the circuit shown in FIG. 1.

Since three-value information is reproduced from the optical disk 1, the distribution information of the signal level data group may be such, for example, as shown in FIG. 3 wherein the axis of ordinate represents a data value (0 to 255) and the axis of abscissa represents a number of samples. It can be seen that, once such distribution information is obtained, the threshold values $L_{S1}$ and $L_{S2}$ for converting 8-bit outputs of the analog to digital converter 7 into three values of "0", "1" and "−1" should be set to two levels at each of which the number of samples presents a minimum value as seen from FIG. 3. In short, optimum threshold values $L_{S1}$ and $L_{S2}$ for the reproduction data from the sector can be calculated from the distribution information (F106).

After the threshold values $L_{S1}$ and $L_{S2}$ are calculated, the CPU 11 controls the multi-value converting circuit 9 so that the multi-value converting operation of the multi-value converting circuit 9 may be performed in accordance with the thus calculated threshold values $L_{S1}$ and $L_{S2}$ (F107). Then, the CPU 11 causes the RAM 10 to execute a reading out operation of the signal level data of the sector and supply the signal level data to the multi-value converting circuit 9 (F108). Consequently, the reproduction RF signal from the first sector of the optical disk 1 upon reproducing operation are three-value converted in accordance with the threshold values $L_{S1}$ and $L_{S2}$.

Subsequently, the loop control variable n is incremented by one (n=n+1) (F110), and then, at the point of time when all signal level data of the reproduction RF signal of the second sector are stored into the RAM 10 (F104), the CPU 11 loads the signal level data from the second sector therein and performs calculation of distribution information and calculation of threshold values in a similar manner as described above. Thus, the signal level data of the reproduction RF signal from the second sector of the optical disk 1 are three-value converted by the multi-value converting circuit 9 in accordance with the threshold values $L_{S1}$ and $L_{S2}$ calculated by the CPU 11 (F104 to F108). After then, such controlling operation is repeated until completion of the reproducing operation (F109).

In this manner, in the present embodiment, since the threshold values $L_{S1}$ and $L_{S2}$ to be used for detection of a reproduction signal of actual reproduction data of each sector are calculated from distribution information of the reproduction data of the sector, even if a level variation or an amplitude variation takes place with the reproduction signal due to a difference in reflection factor between different optical disks or a difference in reproduction frequency characteristic between reproduction signals on the inner circumference side and the outer circumference side of a same optical disk, optimum threshold levels $L_{S1}$ and $L_{S2}$ can always be set, and accordingly, an accurate three-value detecting operation is realized.

Subsequently, three detailed exemplary operations [A], [B] and [C] of calculating threshold values in accordance with distribution information will be described.

[A]

A calculating method will be described first wherein it is premised that a format wherein a ratio of level values of data recorded in one sector is determined in advance is adopted by the optical disk 1. For example, it is presumed that the total number of data of one sector is 300, and the number of the data "0" is 100: the number of the data "1" is 100; and the number of the data "−1" is 100.

Figure 4:
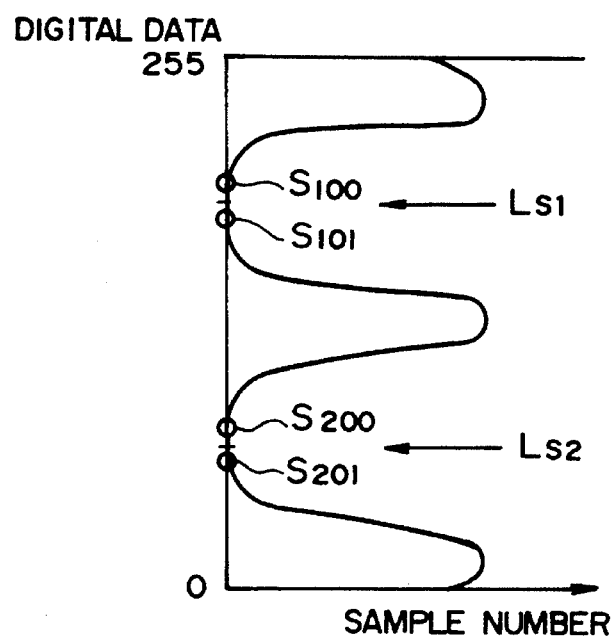
FIGS. 4 to 6 are diagrams illustrating different threshold value calculating operations of the circuit shown in FIG. 1.

In this instance, distribution data of signal level data obtained by analog to digital conversion of a reproduction RF signal are such, for example, as shown in FIG. 4, and it is suitable to set the threshold values $L_{S1}$ and $L_{S2}$ such as shown in FIG. 4. In this instance, the threshold value $L_{S1}$ corresponds to a level value between the 100th signal level data $S_{100}$ and the 101st signal level data $S_{101}$ when the signal level data are arranged in the descending order. Similarly, the threshold value $L_{S2}$ corresponds to a level value between the 200th signal level data $S_{200}$ and the 201st signal level data $S_{201}$ when the signal data are arranged in the descending order. Accordingly, the threshold value $L_{S1}$ can be calculated in accordance with the equation $L_{S1}=\{(S_{100}+S_{101})/2\}$, and the threshold value $L_{S2}$ can be calculated in accordance with the equation $L_{S2}=\{(S_{200}+S_{201})/2\}$.

[B]

Threshold values may be determined from peak values of the occurrence frequency detected from distribution information.

Figure 5:
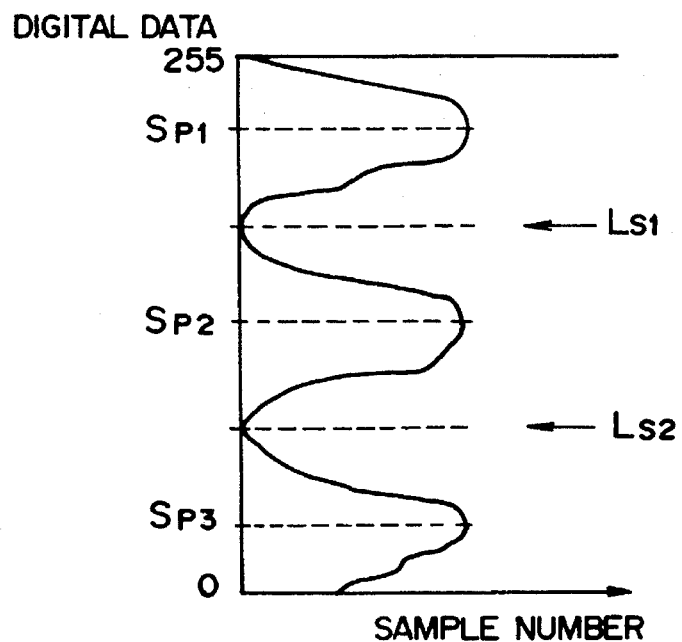

When such distribution information, for example, as illustrated in FIG. 5 is obtained, level values $S_{P1}$, $S_{P2}$ and $S_{P3}$ of the signal level data at which the sample number presents peak points are found out first. Then, if mid values between the peaks are determined as threshold values, then the threshold values are optimum values. Accordingly, the threshold value $L_{S1}$ can be calculated in accordance with the equation $L_{S1}=\{(S_{P1}+S_{P2})/2\}$, and the threshold value $L_{S2}$ can be calculated in accordance with the equation $L_{S2}=\{(S_{P2}+S_{P3})/2\}$.

[C]

Figure 6:
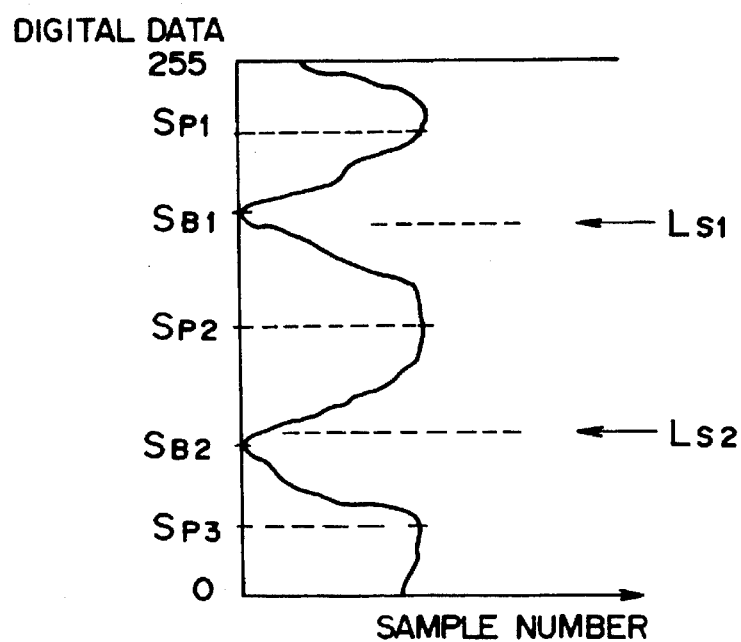

Further, in case it is difficult to discriminate peak values from distribution information as such distribution information illustrated in FIG. 6, threshold values are determined from peak values detected from bottom values of the occurrence frequency which are detected from the distribution information.

In particular, level values $S_{B1}$ and $S_{B2}$ of the signal level data at which the sample number presents bottom points are first found out, and then the analog to digital conversion range is divided into three areas using the bottom values $S_{B1}$ and $S_{B2}$ as boundary values. Then, central values in the individual areas are determined as peak values $S_{P1}$, $S_{P2}$ and $S_{P3}$. In short, the peak value $S_{P1}$ can be calculated in accordance with the equation $S_{P1}=\{(255+S_{B1})/2\}$; the peak value $S_{P2}$ with the equation $S_{P2}=\{(S_{B1}+S_{B2})/2\}$; and the peak value $S_{P3}$ with the equation $S_{P3}=\{(S_{P2}+0)/2\}$. After the peak values $S_{P1}$, $S_{P2}$ and $S_{P3}$ are calculated in this manner, the threshold values $L_{S1}$ and $L_{S2}$ can be determined in a similar manner as in the method [B] described above.

Threshold values may be calculated in accordance with various methods in addition to the methods [A], [B] and [C] described above, and one or a plurality of calculating methods may be adopted depending upon actual construction of a reproducing circuit, a type of a record medium, a distribution characteristic of data and so forth.

It is to be noted that the multi-value recorded data detecting method of the present invention is not limited to the embodiment described above but may be applied in various manners within the scope of the present invention. For example, the multi-value recorded data detecting method can exhibit useful effects when it is applied to a reproducing method or apparatus for any record medium on which multi-value data are recorded such as an optical disk, an opto-magnetic disk or a tape-formed record medium. Further, the multi-value recorded data detecting method can be applied not only to three-value recorded data but also to two-, four- or more-value recorded data, and the present invention becomes more effective when it is applied to recorded data for which a greater number of threshold values are required.

Having now fully described the invention, it will be apparent to one of ordinary skill in the art that many changes and modifications can be made thereto without departing from the spirit and scope of the invention as set forth herein.

What is claimed is:

1. A multi-value recorded data detecting method, comprising the steps of:

convening a reproduction signal from a record medium, on which multi-value data having at least three values are recorded, from an analog signal into a digital signal in response to a reference clock signal to obtain signal level data;

storing in a random access memory the signal level data for at least one predetermined set of multi-value recorded data;

determining a distribution of signal level data stored in the random access memory for each predetermined set of multi-value recorded data, the distribution of signal level data corresponding to the number of samples at each number of bits within an analog-to-digital signal conversion range;

setting at least two threshold values in accordance with the distribution of signal level data; and comparing the signal level data from the random access memory with the threshold values to generate multi-value reproduction data corresponding to the recorded data.

2. A multi-value recorded data detecting method according to claim 1, wherein, setting at least two threshold values further comprises the steps of:

dividing the distribution of signal level data into groups, the data within each group arranged in one of descending and ascending order of distribution;

arranging each group adjacent to at least one other group in one of descending and ascending order of distribution; and selecting an intermediate value between each two adjacent groups.

3. A multi-value recorded data detecting method according to claim 1, wherein setting at least two threshold values further comprises the steps of:

determining the peak values within the distribution of signal level data; and selecting the midpoint of adjacent peaks as each threshold value.

4. A multi-value recorded data detecting method according to claim 1, wherein setting at least two threshold values further comprises the steps of:

determining the minimum values within the distribution of signal level data;

dividing the analog to digital signal conversion range into a plurality of areas, the minimum values defining boundary values;

selecting a midpoint within each area as an assigned peak value; and establishing as threshold values midpoints between adjacent assigned peak values.

5. A multi-value recorded data detecting apparatus, comprising:

means for generating a reference clock signal;

means for converting a reproduction signal from a record medium, on which multi-value data having at least three values are recorded, from an analog signal in to a digital signal in response to the reference clock signal to produce signal level data;

a random access memory for storing the signal level data therein;

means for determining a distribution of signal level data stored in the random access memory for each predetermined set of multi-value recorded data, the distribution of signal level data corresponding to the number of samples at each number of bits within an analog-to-digital signal conversion range;

means for setting at least two threshold values in accordance with the distribution of signal level data; and means for comparing the signal level data from the random access memory with the threshold values to produce multi-value output data.

* * * * *